March 9, 1971     G. R. CRIST ETAL     3,568,264

CLAMP

Filed March 19, 1969

INVENTORS.
GUY RAYMOND CRIST
ROY EARL HILL, JR.

3,568,264
CLAMP

Guy R. Crist, Port Arthur, and Roy Earl Hill, Jr., Bridge City, Tex., assignors to Gulf Oil Corporation, Pittsburgh, Pa.
Filed Mar. 19, 1969, Ser. No. 808,606
Int. Cl. A44b 21/00
U.S. Cl. 24—81                                    8 Claims

ABSTRACT OF THE DISCLOSURE

A scissor action clamp for use with a pair of spaced parallel members comprising a pair of substantially identical clamp halves hinged at one end and provided with registering openings at the other end, in the closed position of the clamp. The clamp is locked and simultaneously provides a location for attachment of other objects by cooperation between the registering openings and such other object.

---

Figure 1:
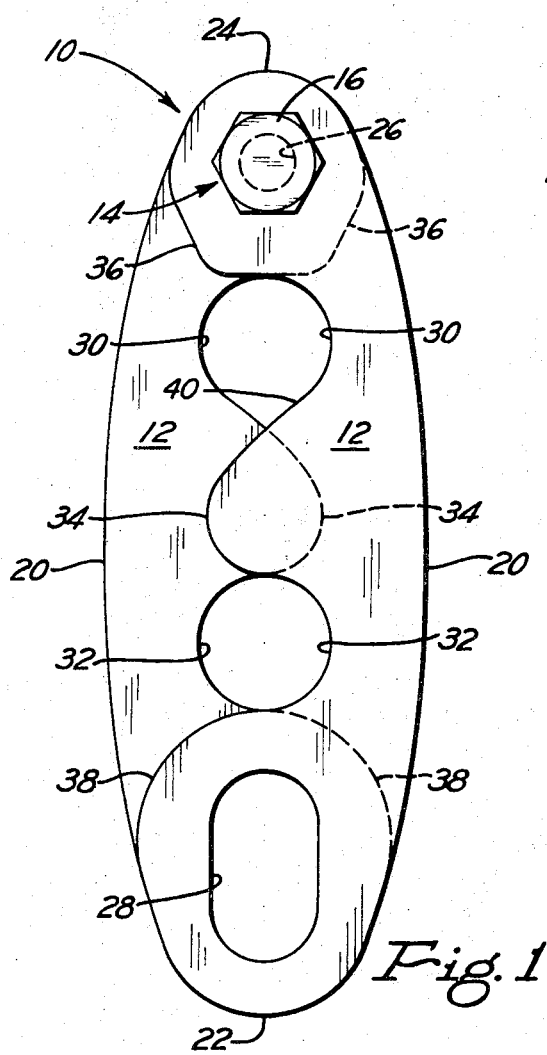

This invention relates to devices for holding and lifting structures made of tubular members, and more particularly to a clamp for supporting a pair of parallel tubular members in position to provide a secure location from which to hang another object or by which to lift the structure which includes the pair of tubular members.

On many occasions in industrial environments such as refineries and factories, it becomes expedient to make or "jerry-rig" various pieces of equipment which are not available, or which are not convenient to bring to the work site, or for various other reasons. For example, if work were being performed at or near the top of a tall unit in a refinery, it might be easier to build a simple hoisting device or "cat head" at the top of the unit and use that to hoist other heavy equipment to the top, rather than to bring a crane to the unit to lift the heavy equipment. In such a situation the necessary bars, tubes, corners, plates, nuts and bolts, etc., and clamps embodying the invention, may be simply carried up the unit to the work site, and the winch block, hoisting device, or "cat head" easily put together there, and later disassembled after the job is completed.

In making such temporary or expedient structures, round bars or hollow cylindrical tubes are often utilized, because such shapes are very common and readily available, and further because commercial structural "kits" comprising matched and mated tubes, corners, fastening means, and the like, are often available in factories and refineries to build other types of temporary structures, such as scaffolds, ladders, and the like. Such structural kits are advantageously used because the parts thereof are easily and quickly assembled and disassembled and because the tubes are all the same size.

However, a problem that arises is that the resulting lifting devices or the like are not strong enough for these other types of work, because the parts were not so intended, and means are required to strengthen such structures. Another problem that arises is that such structures do not naturally provide strong or reinforced locations from which other objects might be hung or from which they may be lifted.

The present invention provides a clamp for use on a pair of spaced, parallel members which will rigidify the two members with respect to each other, and which will simultaneously provide a strengthened location from which the structure can be lifted or at which other objects may be securely attached to the structure. The clamp of the invention consists of a pair of substantially identical members, and a hinge pin or bolt, thereby providing a simply fabricated device, which is sure and positive in use, which is strong and highly reliable, inexpensive to make, and practical and efficient to a high degree in use.

Another advantage of the clamp of the invention is that a workman may easily operate it with only one hand. This advantage is important when making expedient structures because the workman has his other hand free to help secure himself at the work site, which otherwise might be a highly dangerous location.

Figure 2:
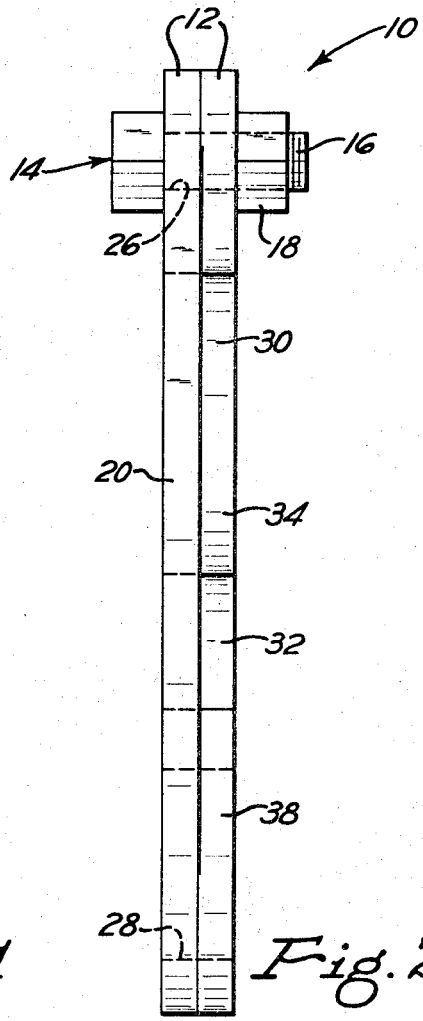
Figure 3:
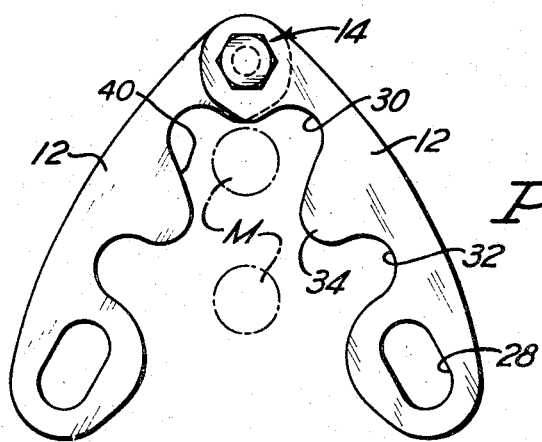

The above and other advantages of the invention will be pointed out or will become evident in the following detailed description and claims, and in the accompanying drawing also forming a part of the disclosure, in which:
FIG. 1 is a front elevational view of a clamp embodying the invention; FIG. 2 is a side elevational view thereof; and FIG. 3 is a view similar to FIG. 1 showing the clamp in open position.

Referring now in detail to the drawing, 10 designates a clamp embodying the invention. Clamp 10 consists of a pair of substantially identical clamp members 12, and a hinge assembly 14. Hinge assembly 14 may comprise any suitable means to hold members 12 together while permitting them to pivot with a scissor-like motion, with respect to each other, such as a pivot pin, or the bolt 16 and nut 18 shown. Suitable locking means, not shown, such as a lock nut or washer, are also included.

Each of the clamping members 12 is formed of flat material, preferably steel, and is generally ellipsoid in plan view. The outside shape of each clamp member is defined by a long curved outside edge 20, a free and smaller radius curved edge 22, and a pivot end still smaller radius curved edge 24. The three outside edges 20, 22, and 24 smoothly blend together to form a smooth, continuous outside edge which makes clamps according to the invention easy to handle, and which eliminates corners, sharp edges and the like to assure that the clamp will not catch on clothing, or get stuck on other things with which it is used.

The pivot end of each member having edge 24 is formed with an opening 26 which receives the pivot member 16 of hinge assembly 14. The free end of each member 12 is formed with an elongated opening 28. When the clamp is closed, as shown in FIGS. 1 and 2, the two openings 28 are in registry, and the registering openings 28 comprise the means to both lock the clamp shut, and to provide a secure location by which other objects may be hung on said assembly or from which the assembly carrying the clamp can be lifted. Of course, the clamp can be used in any orientation, and, as shown, would most likely be used as a place from which to hang other objects. Simultaneous locking and hanging is accomplished by simply passing the hook of a block and tackle, for example, through the registering openings 28 once the clamp 10 is positioned on pair of parallel members.

Means are provided to securely position the clamp of the invention on a pair of parallel members of predetermined size and shape. As shown the clamp is intended for use with two round cross-section members of the same diameter. As will be clear to those skilled in the art, clamps embodying the invention could be made to accommodate two different size members, and/or members having other cross-sectional shapes, such as square or oval, by adjustment of the inside edges described below. To this end, the side of each member 12, opposite edge 20 between the ends 22 and 24, is formed with a pair of cylindrical cut-outs or depressions 30 and 32, which are substantially semi-circular in the embodiment being described. Between the two depressions, each member 12 is formed with a protrusion 34. The other end of cut-out 30 is joined to edge 24 by a compound shaped edge 36, and the outer end of cutout 32 is joined to edge 22 by a different compound shaped edge 38. Each of the two edges 36 and 38 is formed so as to both provide sufficient material around its associated opening 26 or 28 for strength purposes, and to provide edges which, in the closed position of the clamp, will register with portions of edge 20 of the second clamp member. Thus, when the two clamp members are closed, the outline of the clamp will be one smooth ellipsoid to yield the advantages set forth above. The cut-outs 30 and 32 meet the protrusions 34 with smooth flowing edges, so that, as the clamp is closed upon a pair of members M, FIG. 3, the leading, smaller point-like portions of the two protrusions will first enter the space between the two members M, and upon further closing of the clamp, will guide the members on the crossing long smooth edges 40 of the protrusions 34 into the snug fitting circular "opening" defined by the opposed cut-outs 30. A similar result is achieved by the two edges 38 for the "opening" defined by the two cut-outs 32. Thus, if the spacing between the members at the location at which the clamp is to be applied is less than the normal spacing between the members, the clamp will force the members apart, while guiding them into the two "openings," thereby resulting in a more tight fitting connection between the clamp and the two members. Of course, once the members M are locked in the clamp, they will be highly resistant to bending.

The two clamp halves 12 are substantially identical to each other, thereby greatly simplifying manufacture and assembly, and minimizing the cost of manufacture. The shape of the identical members are such that the clamp will operate in a practical and efficient manner, while at the same time yielding these advantages.

While the invention has been described in detail above, it is to be understood that this detailed description is by way of example only, and the protection granted is to be limited only within the spirit of the invention and the scope of the following claims.

We claim:

1. A clamp for use with a pair of spaced parallel members of predetermined cross-sectional shape comprising a pair of clamp members, said clamp members being substantially identical to each other, means to pivot said pair of clamp members one to the other so that said clamp members will open and close with a scissor-like motion, the inner facing edges of each of said clamp members being formed with a pair of spaced depressions each having a shape adapted to snugly fit around at least half of the cross-sectional shape of each of said parallel members, means to guide said parallel members into said depressions as said clamp members are closed upon said parallel members to surround and isolate each of said parallel members within said closed clamp, and means to lock said clamp members closed on said parallel members.

2. The combination of claim 1, said predetermined shape of said parallel members being round, and said depressions being substantially semi-circular and of substantially the same diameter as said parallel members.

3. The combination of claim 1, said surrounding means comprising a protrusion on each of said clamp members extending beyond the imaginary centerline of said clamp in the closed position of the clamp, whereby said protrusions overlie each other in the closed position of said clamp.

4. The combination of claim 3, said guiding means comprising edge portions of each of said clamp members defining said protrusions and blending into one of said depressions in each of said clamp members.

5. The combination of claim 1, said guiding means comprising edge portions of portions of said clamp members which overlie each other in the closed position of said clamp; said edge portions extending from one side of the imaginary centerline of said clamp member, across said centerline, and blending into one of said depressions in each of said clamp members.

6. The combination of claim 5, said locking means comprising a pair of openings formed one in each of said overlying portions of said clamp members, and said openings being in registry with each other in the closed position of said clamp.

7. The combination of claim 1, said clamp members comprising portions which overlie each other in the closed position of said clamp, said locking means comprising a pair of openings formed one in each of said overlying portions of said clamp members, and said openings being in registry with each other in the closed position of said clamp.

8. The combination of claim 7, said clamp members being of generally elongated elliptical shape with said pivot means at one end of the long axis of said clamp and said registering openings at the other end of said long axis.

References Cited

UNITED STATES PATENTS

| | | | |
|---|---|---|---|
| 408,586 | 8/1889 | Coleman | 24—132X |
| 2,917,799 | 12/1959 | Meighan | 24—136 |
| 3,096,551 | 7/1963 | Shoberg | 24—132 |

LEONARD D. CHRISTIAN, Primary Examiner

U.S. Cl. X.R.

24—263